US009191383B2

(12) United States Patent
Trani (10) Patent No.: US 9,191,383 B2
(45) Date of Patent: Nov. 17, 2015

(54) NETWORKED SECURITY SYSTEM WITH TRANSLATING ROUTER

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 55 days.

(21) Appl. No.: 13/847,297

(22) Filed: Mar. 19, 2013

(65) Prior Publication Data

US 2014/0289797 A1     Sep. 25, 2014

(51) Int. Cl.
*H04L 29/06*     (2006.01)
*H04L 12/58*     (2006.01)

(52) U.S. Cl.
CPC ............... *H04L 63/08* (2013.01); *H04L 51/00* (2013.01); *H04L 69/08* (2013.01)

(58) Field of Classification Search
USPC .......................................................... 726/3
See application file for complete search history.

(56) References Cited

U.S. PATENT DOCUMENTS

| | | | |
|---|---|---|---|
| 6,785,730 B1 | 8/2004 | Taylor | |
| 7,486,698 B2 * | 2/2009 | Betts et al. | 370/469 |
| 2005/0120081 A1 * | 6/2005 | Ikenn | 709/203 |
| 2008/0209506 A1 | 8/2008 | Ghai et al. | |
| 2009/0271778 A1 * | 10/2009 | Mandyam et al. | 717/171 |
| 2012/0131117 A1 * | 5/2012 | Leshchiner | 709/206 |
| 2012/0303828 A1 | 11/2012 | Young et al. | |
| 2013/0028251 A1 * | 1/2013 | Lawson et al. | 370/352 |
| 2013/0317753 A1 * | 11/2013 | Kamen et al. | 702/19 |
| 2014/0266669 A1 * | 9/2014 | Fadell et al. | 340/501 |

OTHER PUBLICATIONS

International Search Report and Written Opinion of the International Searching Authority, mailed May 8, 2014, from counterpart International Application No. PCT/US2014/015509, filed Feb. 10, 2014.
International Preliminary Report on Patentability, mailed Jun. 23, 2015, from counterpart International Application No. PCT/US2014/015509, filed Feb. 10, 2014.

* cited by examiner

*Primary Examiner* — Hadi Armouche
*Assistant Examiner* — Ali Shayanfar
(74) *Attorney, Agent, or Firm* — Houston & Associates, LLP (57) ABSTRACT

A system and method for protocol translation between security devices in a security network using a transforming router. The router utilizes protocol templates to identify the protocols that encapsulate messages sent by the devices, and to determine the format of the messages. Using the protocol templates, the router translates the messages from protocols of source security devices to an intermediate protocol, translates the messages in the intermediate protocol into destination protocols for destination security devices, and forwards the messages to the destination security devices.

30 Claims, 8 Drawing Sheets

NETWORKED SECURITY SYSTEM WITH TRANSLATING ROUTER

BACKGROUND OF THE INVENTION

Manufacturers of security systems provide security devices for public and private institutions, commercial businesses, schools, hospitals and government institutions. The security devices are connected to security networks installed in the customer premises. Security systems that were once separate, such as systems for fire detection and suppression, video monitoring, and intrusion detection, are increasingly converging to form integrated or converged security systems connected to a common security network. This provides operators of security networks with improved management, reporting, problem isolation, and fault tolerance capabilities for the security devices in the security network.

Within a security network, security devices send messages to one another in communications protocols. Security devices typically include a combination of software protocol stacks and custom software that implement the communications protocols. The software protocol stacks are typically modeled after the OSI 7-layer model.

Converged security systems integrate many different security devices, or components, that communicate over the security network using standard and proprietary communications protocols. The components range in sophistication from simple sensor devices such as door sensors and access card readers that send one-way unsolicited messages in response to detected events, to more advanced devices such as fire alarm panels, video cameras and network video recorders. The latter devices typically support two-way communications and more flexible communications protocols, such as Internet Protocol ("IP").

Moreover, security networks for converged security systems often include mixed installations of modern and legacy-based security devices. Security devices in modern security systems typically connect to shared bus network segments such as Ethernet, and utilize standard two-way IP protocols. Legacy-based systems, on the other hand, typically utilize a mix of standard and proprietary communications protocols on serial links or network segments.

A major challenge for manufacturers and system integrators of converged security systems is providing interoperability between security devices that support different communications protocols. The interoperability also has to take into account the fact that communicating security devices can reside on separate network segments with different physical layers, such as bus-based Ethernet and serial-based RS-232 links.

Additionally, security devices and the security network itself operate in a high-security environment. The security network is typically isolated from a company's data network. Operators and managers often have access only to those network segments within the security network that are within their immediate control and job function. This creates logistical and operational problems when coordinating and implementing software upgrades for security devices.

Current approaches to solving the problem of interoperability between security devices supporting different communications protocols include the use of custom software drivers, and a unifying protocol super-set. The custom driver approach requires that each security device provide a custom application programming interface ("API"), or server/driver, for each communications protocol that the security device does not currently support. The unifying protocol approach creates a single new protocol that provides interoperability between all security devices in the security network.

SUMMARY OF THE INVENTION

The current approaches to solving the problem of achieving interoperability between security devices supporting different communications protocols in a security network have problems.

The custom driver approach requires that manufacturers implement custom APIs on each security device as part of each device's software executable image. This adds research, development, and testing costs. Operators must then download the new version of the software for each security device in their security network that requires the changes. This creates logistical problems as the number of security devices increases, combined with the aforementioned problems associated with performing device software upgrades in a high-security environment.

The unifying protocol solution has the same logistical problems as the custom driver approach, and introduces protocol performance uncertainties. Many communications protocols used in security devices have existed for 10 years or more and have possibly evolved to their optimal form. A single "one size fits all" unifying protocol could likely degrade critical message timing for certain protocols, for example, and thus operation of the security device itself.

The present invention takes a different approach to solving the problem of achieving interoperability between security devices supporting different communications protocols in a security network. The invention utilizes a universal protocol converter or translator typically operating within a separate device or network appliance that the operator connects to their existing security network. Such as device can also be referred to as a router, or a layer 4 router.

In one example, the solution approaches the problem of unified data aggregation and cross-product interfacing from the perspective of protocol transformation at the byte level of the message data, OSI layer 4, rather than at the application level, OSI layers 6 and 7, of the network interface.

OSI layer 4, also known as the transport layer, is a true "source to destination" or end-to-end layer, and as such is not concerned with the details of the underlying communications facility. It is typically only used by router or firewall firmware, and not by protocol management software. The transport layer typically handles functions such as flow control, reliable message delivery, and multiplexing of multiple simultaneous data streams or sessions onto the same logical communications link.

Like a router in a data network, the layer 4 router forwards messages from source security devices to destination security devices that potentially reside on different network segments. Unlike traditional routers, which make forwarding decisions based on OSI layer 3 data of the messages, however, the layer 4 router processes OSI layer 3 data of the messages at OSI layer 4.

In this way, the layer 4 router essentially repurposes the transport layer for protocol translation and management purposes. The layer 4 router then utilizes a router state engine software module to set up and maintain the communications sessions between source security devices and destination security devices from applications, and to perform the activities usually associated with the transport layer.

The present invention combines the functionality of firewall/router firmware with protocol translation software to create a protocol translation system for security devices in a security network that can accommodate both byte packed and string protocols.

Moreover, the solution creates a template/transform structure to address protocol translation issues rather than fixed protocol translation objects. This creates a unique extensible environment for addressing intra-product communications requirements.

In general, according to one aspect, the invention features a protocol translation system for a security system, comprising a security network and security devices connected to the security network that communicate messages over the security network using communications protocols. A router receives messages from source security devices, translates the messages to new protocols and sends the translated messages to destination security devices. A protocol server provides protocol templates to the router defining the translation of the messages.

Typically, the protocol server resides in a network cloud.

In one example, the protocol templates of the protocol server comprise a protocol identification template ("PIT") that includes a PIT entry that defines the name and format of each protocol supported by the router, which the router uses to identify the communications protocol of the message, and one or more data transform templates ("DTTs") associated with each PIT entry which the router uses to interpret the message.

Each DTT specifies the format of data within the message, and bitmasks for manipulating the data. Each PIT entry in the PIT identifies type of protocol that includes the message, and the name of the associated DTT.

The router preferably performs the message translation by first determining the PIT entry associated with the communications protocol of the source security device, and downloading the associated DTT. Using the DTT to determine the format of the messages, the router then transforms the messages from the source security device into translated messages for the destination security device.

In one aspect, the router forwards the messages from the source security device directly to the destination security device in response to a determination that the communications protocol of the source security device and the communications protocol of the destination security device are the same communications protocol.

In the preferred embodiment, the router determines that the communications protocol of the source security device and the communications protocol of the destination security device are not the same communications protocol, and in response to the determination, translates the messages from the source security devices to the new protocols, and sends the translated messages to destination security devices.

In general, according to another aspect, the invention features a method of operation of a protocol translation system for a security system, comprising a security network, security devices connected to the security network that communicate messages over the security network using communications protocols, a router, and a protocol server. The method comprises receiving messages from source security devices, translating the messages to new protocols, sending the translated messages to destination security devices, and providing protocol templates to the router defining the translation of the messages.

In general, according to another aspect, the invention features a protocol translation system for a security system, comprising a security network including multiple network segments, security devices connected to the security network on the network segments that communicate information over the security network using communications protocols, and a router that receives messages from source security devices in source protocols, translates the messages into an intermediate protocol and then translates the messages into destination protocols of the destination security devices.

In the preferred embodiment, the router utilizes protocol templates to translate the messages from the source security devices in the source protocols into the intermediate protocol, and to translate the messages from the intermediate protocol into destination protocols of the destination security devices. Preferably, the router implements the intermediate protocol as an object in JSON format.

In another example, the protocol translation system includes an application server that includes applications for defining communications sessions between the source security devices and the destination security devices. The applications specify the source security device and the destination security device, and a requested communications protocol for communicating with the destination security device.

In yet another example, the router includes an event subscription service that provides event subscription services to the applications.

The router further comprises a router state engine for maintaining connection state information and for handling data flows between the source security device and the destination security device of the subscribing applications and the router.

According to another aspect, the router, the source security devices, and the destination security devices connect to network segments with different physical layers that support one or more interface types.

Within the security network, the security devices include one or more network video recorders, camera controllers, video cameras, security panels connected to one or more alarm sensors, and door controllers connected to one or more access card readers.

In another example, the security network includes a client system for user interaction with the applications, and a communications head end. The communications head end comprises one or more network video recorders, one or more door controllers that control access card readers, one or more camera controllers that control video cameras, an access control and event management server; and a database connected to the access control and event management server.

In general, according to yet another aspect, the invention features a method of operation of a protocol translation system for a security system, comprising a security network including multiple network segments, security devices connected to the security network on the network segments that communicate information over the security network using communications protocols; and a router. The method comprises receiving messages from source security devices in source protocols, translating the messages into an intermediate protocol, and translating the messages into destination protocols of the destination security devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
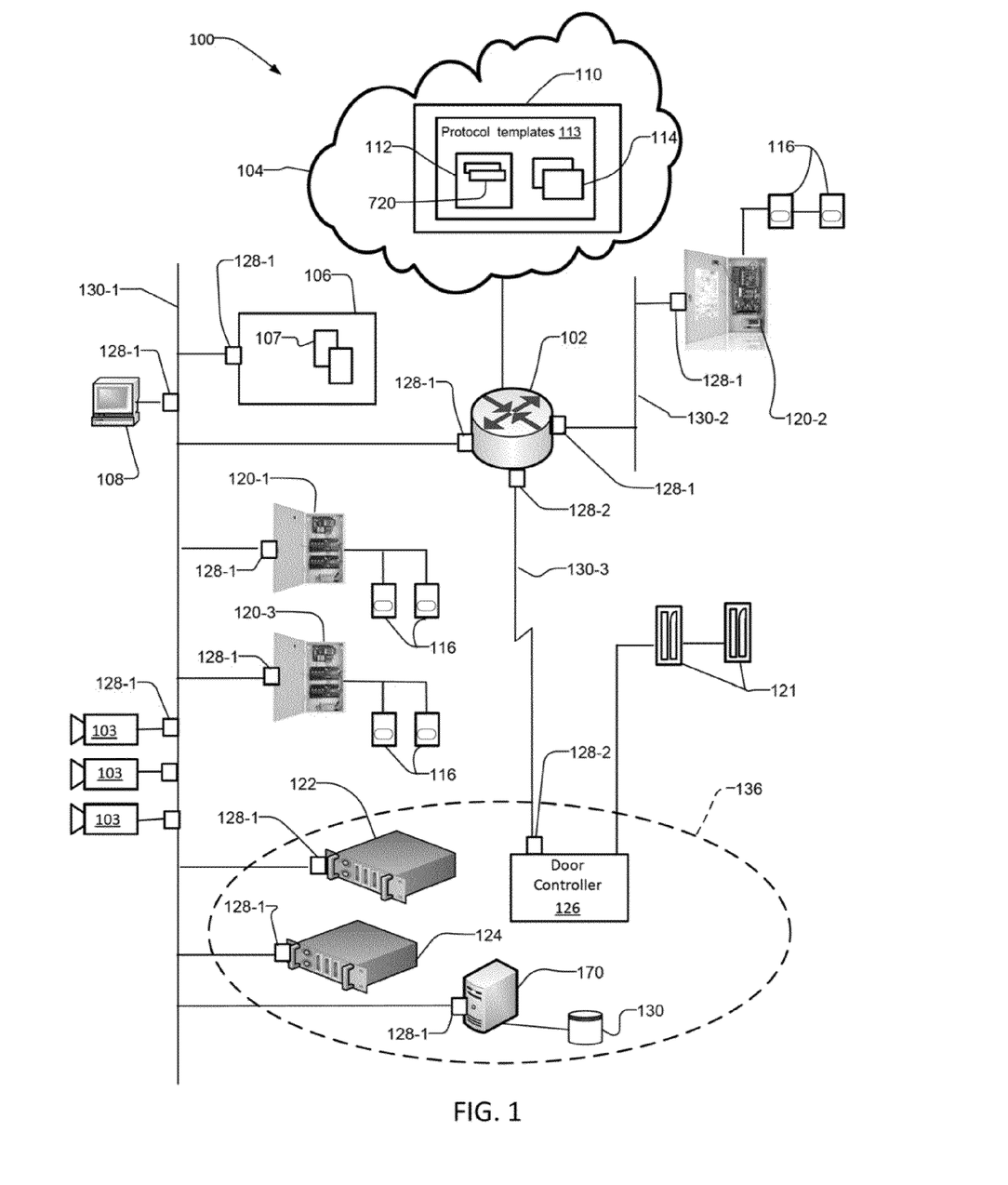
FIG. 1 is a schematic diagram of an example security network that includes a layer 4 transforming router connected to network segments having security devices, according to principles of the present invention.

FIG. 1 is a schematic diagram of an example security network 100. The security network 100 includes multiple devices or components, such as security devices, servers, and workstations. The security devices include sophisticated and unsophisticated security devices.

Sophisticated security devices typically support two-way communications, have network interfaces, and support one or more standard or proprietary communications protocols. One of the standard communications protocols supported by many sophisticated security devices is Internet Protocol ("IP"). Sophisticated security devices include control panels, also known as field panels 120, video cameras 103, one or more network video recorders 122, and one or more door controllers 126.

Unsophisticated security devices, such as fire alarm sensors 116 and access card readers 121, typically support one-way communications. They are also known as sensor devices. Sensor devices connect to a receiving device, and send unsolicited messages to the receiving device in response to state changes in the sensor devices. The fire alarm sensors 116 connect to the field panels 120, and the access card readers 121 connect to the door controller 126.

A router 102, also known as a layer 4 transforming router, typically connects to each network segment 130 in the security network 100. The router 102 provides the potential for a security device connected to a network segment 130 to communicate with any other security device connected to a network segment 130 in the security network 100 even despite protocol mismatches.

An applications server 106 connects to at least one of the network segments 130 as the router 102 does. The applications server 106 includes one or more applications 107. A camera controller 124 controls the video cameras 103. The door controller 126 controls one or more access card readers 121. An access control and event management server 170 monitors system events.

A database 130 connected to the access control and event management server 170 saves event data. The network video recorder 122, the door controller 126, the camera controller 124, and the access control and event management server 170 are included in a communications head end 136.

A client workstation 108 connects to a network segment 130 that is also connected to the applications server 106, such as network segment 130-1. Using the client workstation 108, the operator defines parameters for the applications 107. The applications 107 specify communications sessions 500 between source security devices and destination security devices.

Figure 3:
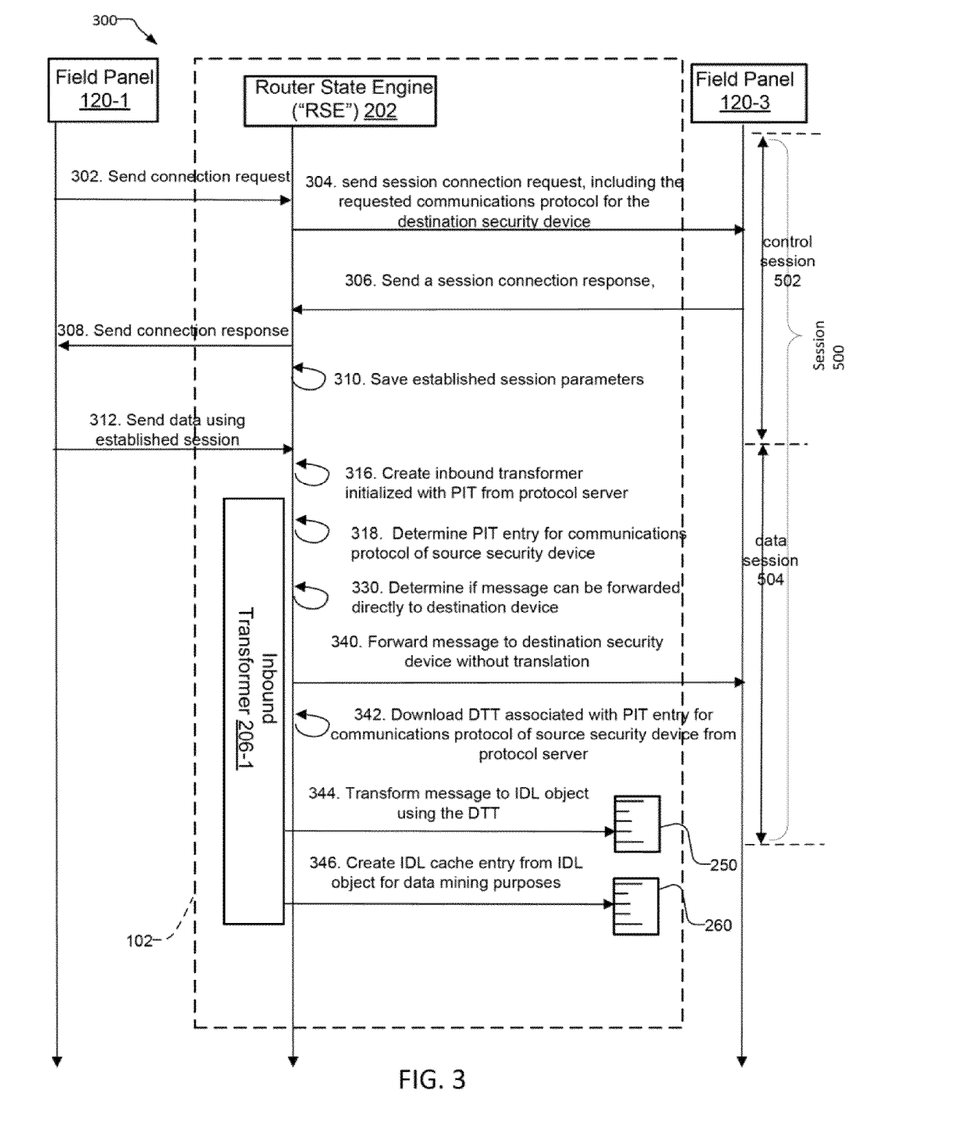
FIG. 3 is a sequence diagram illustrating the operation of the layer 4 transforming router according to the preferred embodiment of the present invention, displaying an example communication session between two security devices connected across the layer 4 transforming router, where the security devices utilize the same communications protocol.
Figure 4:
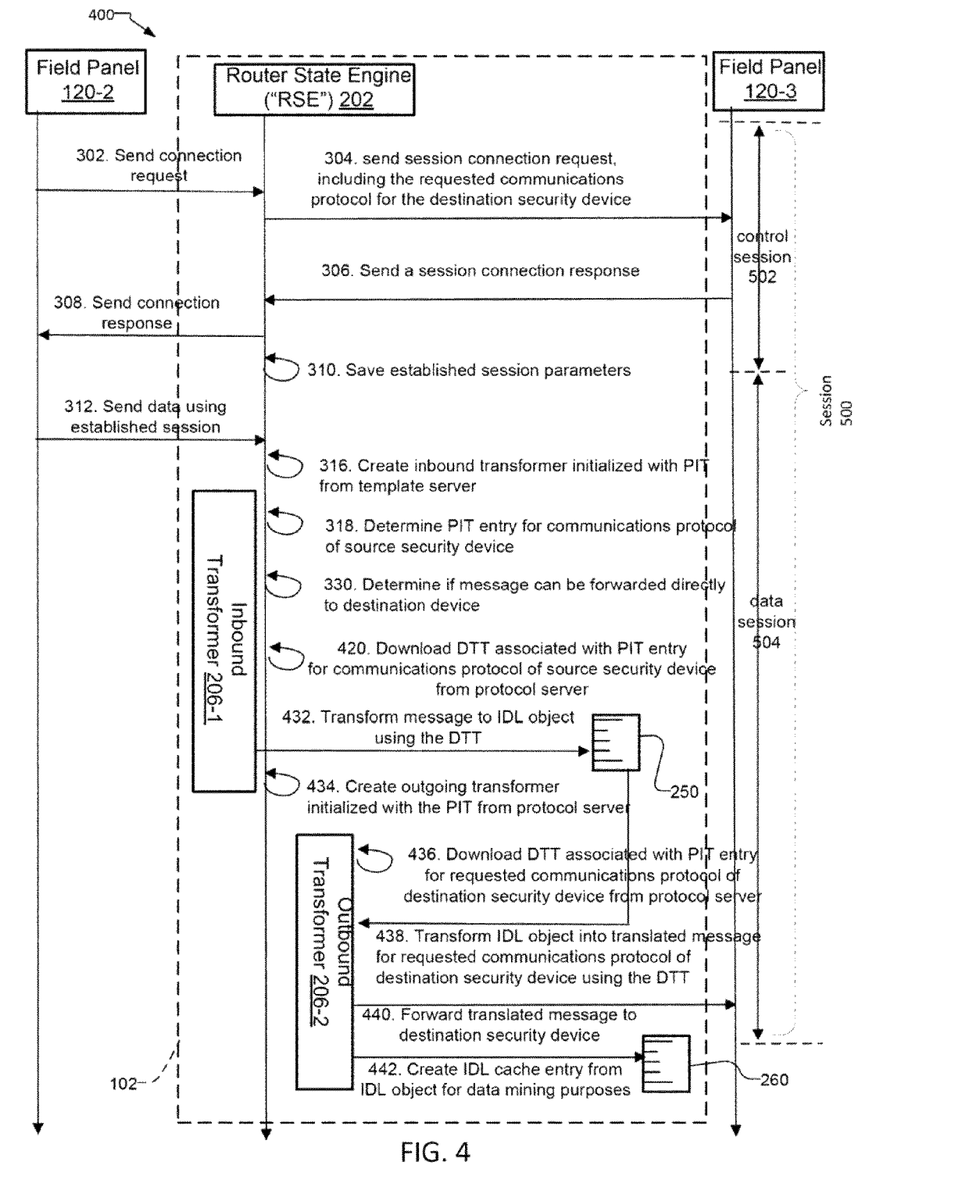
FIG. 4 is a sequence diagram illustrating the operation of the layer 4 transforming router according to the preferred embodiment of the present invention, displaying an example communication session between two security devices connected across the layer 4 transforming router, where the security devices utilize different communications protocols.

For the applications 107, operators define parameters such as the source security device, the destination security device, and a requested communications protocol to use for communications with the destination security device. Example communications sessions 500 between source and destination security devices are illustrated in FIG. 3 and FIG. 4 and will be described in more detail in the description for those figures.

The security network 100 includes network segments 130 that support different physical layers, such as shared LAN segments and serial links. Devices utilize interfaces or ports 128 for connecting to the network segments 130. In the example, network segments 130-1 and 130-2 are shared LAN segments, and the devices that connect to the network segments 130-1 and 130-2 utilize Ethernet interfaces 128-1. Network segment 130-3 is a serial link, and the devices that connect to network segment 130-3 utilize USB interfaces 128-2.

The application server 106, the client workstation 108, field panels 120-1 and 120-3, the video cameras 103, the camera controller 124, the network video controller 122, and the access control and event management server 170 connect to network segment 130-1 via Ethernet interfaces 128-1. Field panel 120-2 connects to network segment 130-2 via an Ethernet interface 128-1. The door controller 126 connects to network segment 130-3 via a USB interface 128-2.

The router 102 connects to network segment 130-1 and 130-2 via an Ethernet interface 128-1, and to network segment 130-3 via a USB interface 128-2. The router 102 also has a connection to a network cloud 104. As part of its protocol translation services, the router 102 downloads protocol templates 113 from a protocol server 110 within the network cloud 104.

The protocol templates 113 include a Protocol Identification Template ("PIT") 112, and one or more Data Transform Templates ("DTT") 114. For this reason, the protocol server 110 is also referred to as a DTT/PIT server in other figures.

The PIT 112 has one or more entries, also known as PIT entries 720. Each PIT entry 720 defines the format of a specific communications protocol. The router 102 uses the PIT 112 to identify the communications protocols utilized by the security devices specified in the applications 107. An example PIT entry 720 is displayed in FIG. 7A.

Figure 2:
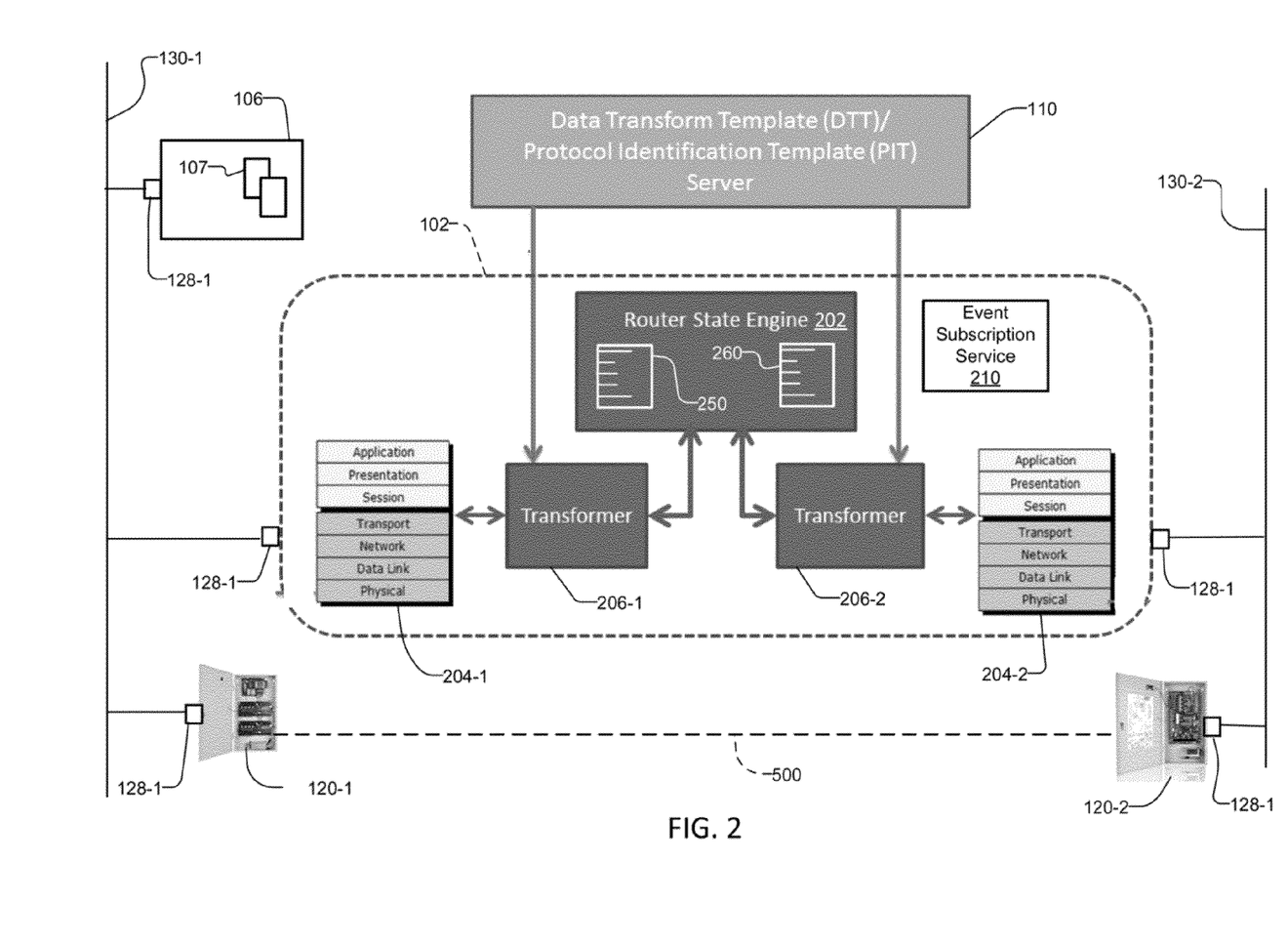
FIG. 2 is a schematic diagram displaying detail for the layer 4 transforming router.

FIG. 2 shows the detail for the router 102 during an exemplary communication session 500 between two security devices. Field panel 120-1 is the source security device, and connects to network segment 130-1 via Ethernet interface 128-1. Field panel 120-2 is the destination security device, and connects to network segment 130-2 via Ethernet interface 128-1.

The router 102 includes an event subscription service 210 that provides event subscription services. The event subscription service 210 provides network discovery services based on zeroconf, and subscription services based on the General Event Notification Architecture ("GENA"). The router also includes a router state engine ("RSE") 202.

The operator defines parameters for the session 500 in an application 107 running on the application server 106. The parameters include the source security device, the destination security device, and a requested communications protocol for communicating with the destination security device.

Using the parameters in the subscribing application 107, the router state engine 202 sets up a control session 502 between field panel 120-1 and field panel 120-2. Once the control session 502 is established, the router state engine 102 begins the data session 504 and awaits messages from field panel 120-1.

Buffer 204-1 contains the message from the source security device, field panel 120-1. In response to receiving messages from the source security device, the router state engine 202 must then determine the communications protocol of the message. For this purpose, the router state engine 202 creates an inbound transformer 206-1 software module. The router state engine 202 then downloads the PIT 112 from the protocol server 110, and initializes the inbound transformer 206-1 with the contents of the PIT 112.

The PIT 112 contains the full set of all communications protocols supported by the router 102. The PIT 112 has a PIT entry 720 for each communications protocol that the router 102 supports. Preferably, the PIT 112 is in JSON format.

In the preferred embodiment, the router 102 performs the message translation by first utilizing the inbound transformer 206-1 to determine the PIT entry 720 associated with the communications protocol of the source security device. The inbound transformer 206-1 performs the parsing of the messages at OSI layer 4, comparing OSI layer 3 data of the messages from the source security device with the data fields of each PIT entry 720 in the PIT 112.

Each PIT entry 720 includes information such as the length 728 and protocol name 724 associated with a message. This allows the router state engine 202 through its transformers 206 to match the message contents to a unique PIT entry 720, to identify the communications protocol associated with the message. The format of a typical PIT entry 720 and more detail associated with PIT entries 720 is provided in the description of FIG. 7A.

The PIT entry 720 identifies the overall envelope of the message, the communications protocol that contains the message. However, the inbound transformer 206-1 requires more information to interpret the format and contents of the payload, the data within the message. At this point, the inbound transformer 206-1 sees the message data only an opaque sequence of bits, arranged in octets. This is also known as byte array format.

For interpreting the format and content of the message data, each PIT entry 720 also contains a DTT name 732 field that points to the name of a Data Transform Template ("DTT") 114. Preferably, each DTT 114 is in JSON format. The inbound transformer 206-1 downloads the associated DTT from the protocol server 110. The format of a typical DTT 114 and more detail associated with DTTs 114 is provided in the description of FIG. 7B.

The router 102 performs the next step in the message translation by creating a new protocol, or intermediate representation of the message, within the router state engine 202. Using the DTT 114, the inbound transformer 206-1 creates an Intermediate Data Language ("IDL") object 250 from the message data.

The router 102 performs the next step in the message translation by creating an IDL cache entry 260 associated with the IDL object 250. The router 102 then serializes the IDL cache entry 260 to non-volatile memory to provide persistence of the IDL object 250 associated with the IDL cache entry 260 through router restarts.

The router 102 performs the next step in the message translation by determining if the communications protocol of the source security device and the requested communications protocol for the destination security device are the same communications protocol. If the protocols are the same, the router 102 then forwards the received message in buffer 204-1 directly to the destination security device, field panel 120-2.

In the example, however, the communications protocol for the source security device, field panel 120-1, and the requested communications protocol for the destination security device are different communications protocols. As a result, the router 102 must transform the message from the format of the source communications protocol to the format of the requested communications protocol before forwarding the message to field panel 120-2.

The router 102 performs the next step in the message translation by preferably creating an outbound transformer 206-2 initialized with contents of the PIT 112. The outbound transformer 206-2 selects the PIT entry 720 associated with the requested communications protocol, and then downloads the associated DTT 114 pointed to by the DTT name 732 field of the PIT entry 720 from the protocol server 110.

The outbound transformer 206-2 then that translates the IDL object 250 to translated messages using the DTTs 114 associated with the requested communications protocol. Then, the router 102 buffers the translated messages into buffer 204-2, and sends the translated messages in buffer 204-2 to the destination security device, field panel 120-2.

FIG. 3 is a sequence diagram 300 illustrating the operation of the router 102 according to an embodiment, displaying an example communication session 500 between two security devices connected across the router, where the security devices utilize the same communications protocol.

Session 500, which includes a control session 502 and a data session 504, takes place between a source security device, field panel 120-1, and a destination security device, field panel 120-3. The router state engine 202 ("RSE") of the router 102 sets up and maintains the control session 502 between the devices. Once the control session 502 is established, the router state engine 202 waits to receive messages from the field panel 120-1 to begin the data session 504.

The control session 502 begins when the field panel 120-1 in step 302 sends a connection request to the router state engine 202 to connect to field panel 120-3. In response, the RSE 202 in step 304 sends a session connection request, including the requested communications protocol type for the destination security device. Field panel 120-3 in step 306 sends a session connection response to the RSE 202, which then sends a connection response in step 308 to the field panel 120-1. If the connection is successful, the RSE 202 saves the established session parameters in step 310, and waits to receive data from the field panel 120-1.

The data session 504 begins when field panel 120-1 sends message data using the established control session 502 in step 312. In response, the RSE 202 in step 316 creates an inbound transformer 206-1 initialized with the PIT 112 from the protocol server 110. In step 318, the RSE 202 through its inbound transformer 206-1 then determines the PIT entry 720 for the communications protocol of source security device, field panel 120-1.

In step 330, the inbound transformer 206-1 determines if message can be forwarded directly to the destination security device. The RSE 202 forwards the message to destination security device without translation. This is because the security devices utilize the same communications protocol in step 340.

The RSE 202 downloads the DTT 114 associated with the PIT entry 720 for communications protocol of source security device from protocol server 110 in step 342. In step 344, the RSE 202 transforms the message to the IDL object 250 using the DTT 114. The RSE 202 creates an IDL cache entry 260 from the IDL object 250 for data mining purposes in step 346.

FIG. 4 is a sequence diagram 400 illustrating the operation of the layer 4 transforming router 102, displaying an example communication session between two security devices connected across the layer 4 transforming router 102, where the security devices utilize different communications protocols.

Session 500, which includes a control session 502 and a data session 504, takes place between a source security device, field panel 120-2, and a destination security device, field panel 120-3. The router state engine 202 ("RSE") of the router 102 sets up and maintains the control session 502 between the devices. Once the control session 502 is established, the router state engine 202 waits to receive messages from the field panel 120-2 to begin the data session 504.

The control session 502 begins when the field panel 120-2 in step 302 sends a connection request to the router state engine 202 to connect to field panel 120-3. In response, the RSE 202 in step 304 sends a session connection request, including the requested communications protocol for the destination security device. Field panel 120-3 in step 306 sends a session connection response to the RSE 202, which then sends a connection response in step 308 to the field panel 120-2. If the connection is successful, the RSE 202 saves the established session parameters in step 310, and waits to receive data from the field panel 120-2.

The data session 504 begins when field panel 120-2 sends message data using the established control session 502 in step 312. In response, the RSE 202 in step 316 creates an inbound transformer 206-1 initialized with the PIT 112 from the protocol server 110. In step 318, the RSE 202 through its inbound transformer 206-1 then determines the PIT entry 720 for the communications protocol of source security device, field panel 120-2.

In step 330, the inbound transformer 206-1 determines if message can be forwarded directly to the destination security device. Because the example specified different communications protocols between the source and destination security devices, the router 102 must first transform the message into the requested protocol for the destination security device before the router 102 can forward the message to the destination security device.

To start the transformation, in step 420, the RSE 202 downloads the DTT 114 associated with the PIT entry 720 for the communications protocol of the source security device from protocol server 110. In step 432, the RSE 202 transforms the message to the IDL object 250 using the DTT 114.

In step 434, the RSE 202 creates an outbound transformer 206-2 initialized with the PIT 112 from the protocol server 110. In step 436, the RSE 202 downloads the DTT 114 associated with the PIT entry 720 for the requested communications protocol of the destination security device from the protocol server 110.

In step 438, the RSE 202 transforms the IDL object 250 into a translated message for requested communications protocol of destination security device using the DTT 114. In step 440, the RSE 202 forwards the translated message to the destination security device, field panel 120-3. In step 442, the RSE 202 creates an IDL cache entry 260 from the IDL object 250 for data mining purposes.

Figure 5:
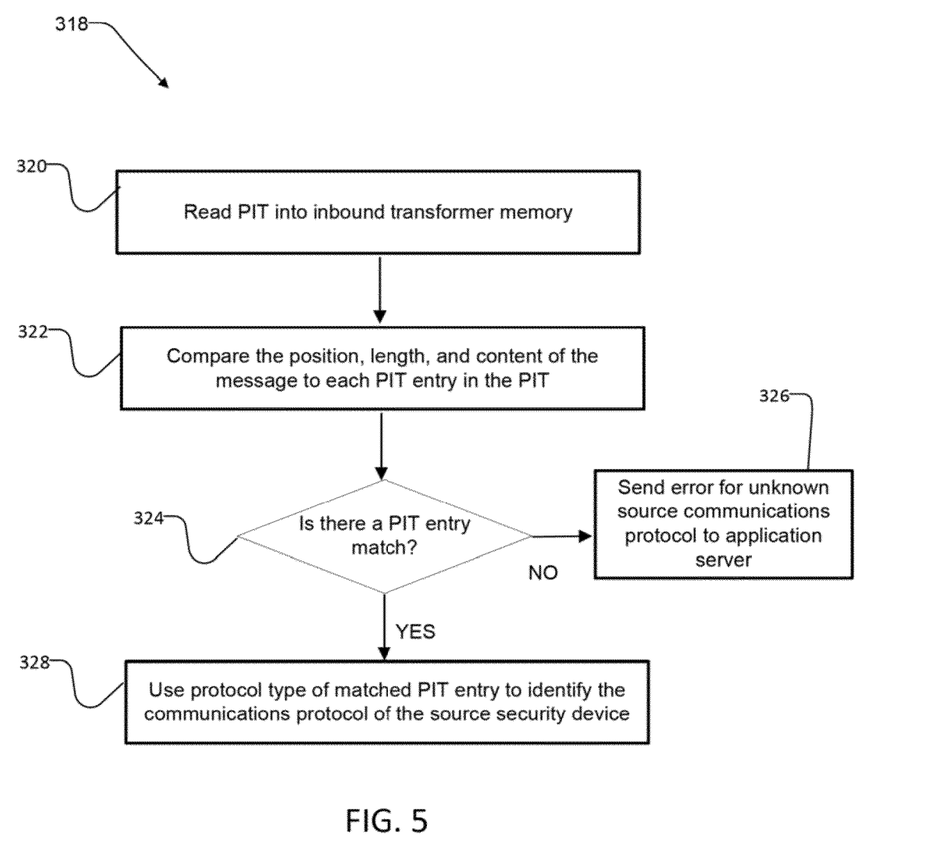
FIG. 5 is a flow diagram illustrating how the layer 4 router determines the communications protocol of the source security device.

FIG. 5 is a flow diagram illustrating how the layer 4 router 102 determines the communications protocol of the source security device, providing detail of step 318 from FIG. 3 and FIG. 4. In step 320, the inbound transformer 206-1 reads the PIT 112 into inbound transformer 206-1 memory. In step 322, the inbound transformer 206-1 compares the position, length, and content of the message to each PIT entry 720 in the PIT 112.

In step 324, the inbound transformer 206-1 determines if there is a PIT entry 720 match. If no match occurs, the inbound transformer 206-1 proceeds to step 326, where the inbound transformer 206-1 sends an error for unknown source communications protocol to the application server 107. If a match occurs, the inbound transformer 206-1 proceeds to step 328, to use protocol type of matched PIT entry 720 to identify the communications protocol of the source security device.

Figure 6:
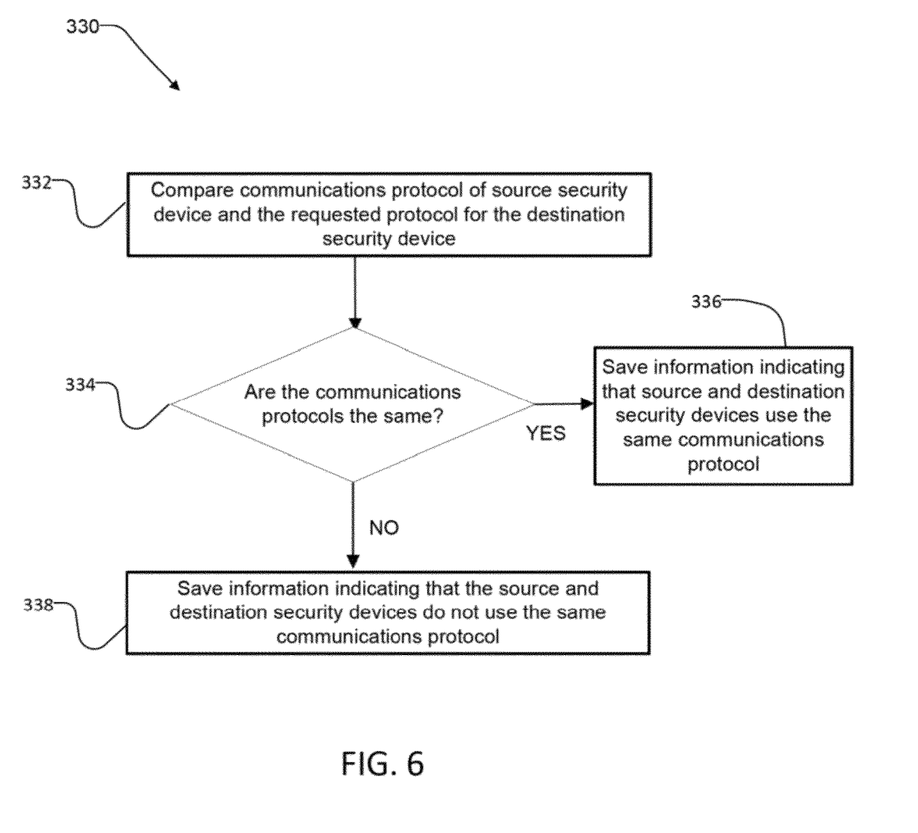
FIG. 6 is a flow diagram illustrating how the layer 4 router determines if the communications protocol of the source security device and the requested communications protocol of the destination security device is the same communications protocol.

FIG. 6 is a flow diagram illustrating how the layer 4 router 102 determines if the communications protocol of the source security device and the requested communications protocol of the destination security device is the same communications protocol, providing detail of step 330 from FIG. 3 and FIG. 4.

In step 332, the inbound transformer 206-1 of the RSE 202 compares the communications protocol of the source security device and the requested protocol for the destination security device. In step 334, the inbound transformer 206-1 determines if the communications protocols are the same. If the protocols are the same, the inbound transformer 206-1 proceeds to step 336, and saves information indicating that source and destination security devices use the same communications protocol. If the protocols are not the same, the inbound transformer 206-1 proceeds to step 338, and saves information indicating that source and destination security devices do not use the same communications protocol.

Figures 7A, 7B:
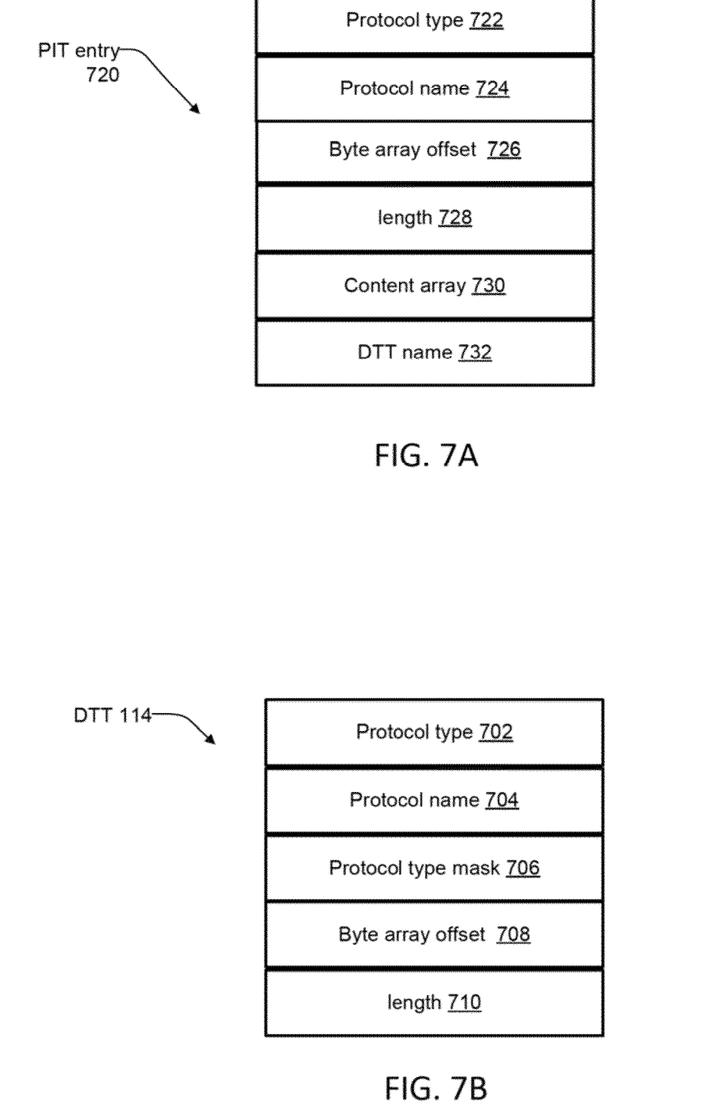
FIG. 7A illustrates one example of a Protocol Identification Template ("PIT") entry within a Protocol Identification Template.
FIG. 7B illustrates one example of a Data Transform Template ("DTT")

FIG. 7A illustrates one example of a PIT entry 720 within a PIT 112. The PIT 112, via its PIT entries 720, provides a dictionary of all protocols supported by the router 102. In other examples, PIT entries 720 also exist for individual actions or instructions. Each PIT entry 720 contains the position, length and content of one or more fields that will identify the communications protocol associated with messages in byte array format from security devices.

Each PIT 720 entry in the PIT 112 includes the following fields: protocol type 722, protocol name 724, byte array offset 726, length 728, a content array 730, and a DTT name 732 that points to the protocol name 704 of the associated DTT 114.

In the preferred embodiment, the inbound transformer 206-1 determines the PIT entry 720 associated with the communications protocol of the source security device at OSI layer 4 by comparing OSI layer 3 data of the messages from the source security device with the byte array offset 726, length 728, and content array 730 of each PIT entry 720 in the PIT 112.

FIG. 7B illustrates one example of a Data Transform Template ("DTT") 114. DTT 114s provide a data map to the transformers 206 for converting the incoming message in byte array format from the source security device into the IDL object 250, or translating the IDL object 250 into a translated message in byte array format for forwarding to the destination security device.

DTTs 114 typically define the message and data format for communications protocols. In other examples, DTTs 114 define individual actions or instruction within a protocol.

Each DTT 114 includes the following fields: protocol type 702, protocol name 704, protocol type mask 706, byte array offset 708, and length 710.

The transformers 206 map each field within the DTT 114 to the byte array of the message data using the byte array offset 708 and length 710 fields. The protocol type 702 field is an enumeration of supported types defined in the DTT 114 framework. The protocol type 702 also supports bit references within a byte, using the protocol type mask 706 field. This allows the protocol associated with the DTT 114 to take advantage of bit level Boolean values.

Figure 7C:
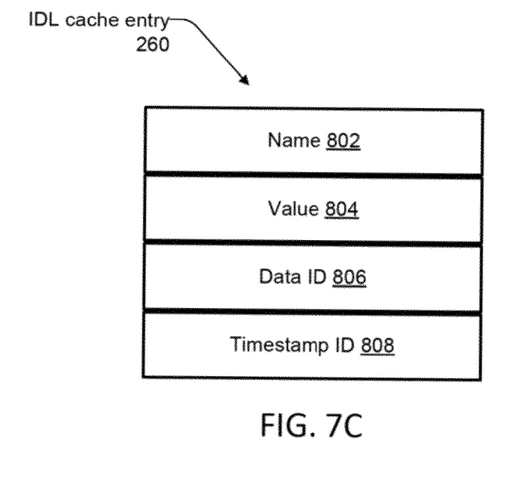
FIG. 7C illustrates one example of an Intermediate Data Language ("IDL") cache entry.

FIG. 7C illustrates one example of an Intermediate Data Language ("IDL") cache 260 entry. The router 102 creates an IDL cache entry 260 of the IDL object 250 for data mining purposes by external applications. Additionally, the router serializes the IDL cache entry 260 to non-volatile memory to provide persistence of the IDL object 250 associated with the IDL cache entry 260 through router restarts.

In one example, the IDL cache entry 260 includes the following fields: a name 802, a value 804, a data ID 806, and a timestamp ID 808. The value 804 field contains the data from the associated IDL object 250. The data ID 806 field utilizes a globally unique identifier ("GUID") to act as a primary key for the data in the value 804 field. The same GUID used in the data ID 806 field is also included as part of the contents of the timestamp ID 808 field.

While this invention has been particularly shown and described with references to preferred embodiments thereof, it will be understood by those skilled in the art that various changes in form and details may be made therein without departing from the scope of the invention encompassed by the appended claims.

What is claimed is:

1. A protocol translation system for a security system, comprising:
   a security network;
   field panels that communicate over the security network using communications protocols;
   fire alarm sensors connected to the field panels;
   a router that receives messages from source field panels, translates the messages to new protocols and sends the translated messages to destination field panels; and
   a protocol server that provides protocol templates to the router defining the translation of the messages, the protocol server residing in a network cloud remote from the router;
   wherein the router performs the message translation by determining an entry associated with the communications protocol of the source field panel, downloading an associated data transform template, determining the format of the messages, and transforming the messages from the source field panel into translated messages for the destination field panel.

2. The system of claim 1, wherein the protocol templates of the protocol server comprise:
   a protocol identification template ("PIT") that includes a PIT entry that defines the name and format of each protocol supported by the router, which the router uses to identify the communications protocol of the messages from the field panels; and
   one or more data transform templates ("DTTs") associated with each PIT entry which the router uses to interpret the messages.

3. The system of claim 2, wherein each DTT specifies the format of data within the messages and bitmasks for manipulating the data.

4. The system of claim 2, wherein each PIT entry in the PIT identifies type of protocol that includes the messages, and the name of the associated DTT.

5. The system of claim 1, wherein the router forwards the messages from the source field panel directly to the destination field panel in response to a determination that the communications protocol of the source field panel and the communications protocol of the destination field panel are the same communications protocol.

6. The system of claim 1, wherein the router determines that the communications protocol of the source field panel and the communications protocol of the destination field panel are not the same communications protocol, and in response to the determination, translates the messages from the source field panels to the new protocols, and sends the translated messages to destination field panels.

7. The system of claim 1, wherein the router translates the messages by creating intermediate representations of the messages using the data transform templates and using the transform template to translate the messages from intermediate representation into the new protocols for the destination field panels.

8. A method of operation of a protocol translation system for a security system, comprising a security network, field panels communicating over the security network using communications protocols, fire alarm sensors connected to the field panels, a router, and a protocol server, the method comprising:
   the router receiving messages from source field panels;
   the router translating the messages to new protocols by determining an entry associated with the communications protocol of the source field panel, loading an associated protocol transform template, using the protocol transform template to determine the format of the messages, and transforming the messages from the source field panel into translated messages for destination field panel;
   the router sending the translated messages to the destination field panels; and
   the protocol server, which resides in a network cloud remote from the router, providing the protocol transform templates to the router defining the translation of the messages.

9. The method of claim 8, wherein the protocol transform templates of the protocol server comprise:
   a protocol identification template ("PIT") that includes a PIT entry that defines the name and format of each protocol supported by the router, which the router uses to identify the communications protocol of the messages from the field panels; and
   one or more data transform templates ("DTTs") associated with each PIT entry which the router uses to interpret the messages.

10. The method of claim 9, further comprising each DTT specifying the format of data within the messages, and bitmasks for manipulating the data.

11. The method of claim 9, further comprising identifying type of protocol that includes the messages, and the name of the associated DTT.

12. The method of claim 8, further comprising the router forwarding the messages from the source field panel directly to the destination field panel in response to determining that the communications protocol of the source field panel and the communications protocol of the destination field panel are the same communications protocol.

13. The method of claim 8, further comprising the router determining that the communications protocol of the source field panel and the communications protocol of the destination field panel are not the same communications protocol, and in response to the determination, translating the messages from the source field panels to the new protocols, and sending the translated messages to destination field panels.

14. The method of claim 8, wherein the router translating the messages comprises
creating intermediate representations of the messages using the transform template, and
using the transform template to translate the messages from intermediate representations into the new protocols for the destination field panels.

15. A protocol translation system for a security system, comprising:
a security network including multiple network segments;
field panels connected to the security network on the network segments that communicate information over the security network using communications protocols;
fire alarm sensors connected to the field panels; and
a router that receives messages from source field panels in source protocols, translates the messages into an intermediate protocol and then translates the messages into destination protocols of destination field panels by determining an entry associated with the communications protocol of the source field panel, loading an associated protocol transform template from a protocol server residing in a network cloud remote from the router, using the protocol transform template to determine the format of the messages, and transforming the messages from the source field panel into translated messages for the destination field panel.

16. The system of claim 15, wherein the router utilizes the protocol transform templates to translate the messages from the source field panels in the source protocols into the intermediate protocol, and to translate the messages from the intermediate protocol into destination protocols of the destination field panels.

17. The system of claim 16, wherein the router implements the intermediate protocol as an object in JSON format.

18. The system of claim 15, further comprising:
an application server that includes applications for defining communications sessions between the source field panels and the destination field panels, wherein the applications specify:
the source field panel and the destination field panel; and
a requested communications protocol for communicating with the destination field panel.

19. The system of claim 18, wherein the router includes an event subscription service that provides event subscription services to the applications.

20. The system of claim 19, wherein the router further comprises a router state engine for maintaining connection state information and for handling data flows between the source field panel and the destination field panel of the subscribing applications and the router.

21. The system of claim 15, wherein the router, the source field panels, and the destination field panels connect to network segments with different physical layers that support one or more interface types.

22. The system of claim 15, further comprising one or more network video recorders, camera controllers, video cameras, and door controllers connected to one or more access card readers.

23. The system of claim 22, further comprising:
a client system for user interaction with the applications; and
a communications head end that comprises:
one or more network video recorders;
one or more door controllers that control access card readers;
one or more camera controllers that control video cameras;
an access control and event management server; and
a database connected to the access control and event management server.

24. A method of operation of a protocol translation system for a security system, comprising a security network including multiple network segments, field panels connected to the security network on the network segments that communicate information over the security network using communications protocols, fire alarm sensors connected to the field panels; and a router, the method comprising:
the router receiving messages from source field panels in source protocols;
the router translating the messages into an intermediate protocol and the router translating the messages into destination protocols of destination field panels by determining an entry associated with the communications protocol of the source field panel, loading an associated protocol transform template from a protocol server residing in a network cloud remote from the router, using the protocol transform template to determine the format of the messages, and transforming the messages from the source field panel into translated messages for the destination field panel.

25. The method of claim 24, further utilizing protocol transform templates for translating the messages from the source field panels in the source protocols into the intermediate protocol, and for translating the messages from the intermediate protocol into destination protocols of the destination field panels.

26. The method of claim 25, further comprising implementing the intermediate protocol as an object in JSON format.

27. The method of claim 24, further comprising including applications for defining communications sessions between the source field panels and the destination field panels, wherein the applications specify:
the source field panel and the destination field panel; and
a requested communications protocol for communicating with the destination field panel.

28. The method of claim 27, further comprising providing event subscription services to the applications via an event subscription service.

29. The method of claim 28, further comprising maintaining connection state information and for handling data flows between the source field panel and the destination field panel of the subscribing applications and the router.

30. The method of claim 24, further comprising connecting to network segments with different physical layers that support one or more interface types.

* * * * *